(12) United States Patent
Karlov et al.

(10) Patent No.: US 11,841,432 B2
(45) Date of Patent: Dec. 12, 2023

(54) SYSTEM AND METHOD FOR SINGLE-SENSOR MULTI-TARGET 3D TRACKING IN AN UNBIASED MEASUREMENT SPACE

(71) Applicant: RAYTHEON COMPANY, Waltham, MA (US)

(72) Inventors: Valeri I. Karlov, Stony Brook, NY (US); Steven A. Miles, Plano, TX (US); Aaron Maestas, McKinney, TX (US); Jason R. Mcmurtrey, Dallas, TX (US)

(73) Assignee: RAYTHEON COMPANY, Waltham, MA (US)

( * ) Notice: Subject to any disclaimer, the term of this patent is extended or adjusted under 35 U.S.C. 154(b) by 572 days.

(21) Appl. No.: 16/897,858

(22) Filed: Jun. 10, 2020

(65) Prior Publication Data

US 2021/0389461 A1    Dec. 16, 2021

(51) Int. Cl.
*G01S 17/50*    (2006.01)
*G01S 7/48*    (2006.01)
*G01S 17/42*    (2006.01)

(52) U.S. Cl.
CPC ............ *G01S 17/50* (2013.01); *G01S 7/4808* (2013.01); *G01S 17/42* (2013.01)

(58) Field of Classification Search
None
See application file for complete search history.

(56) References Cited

U.S. PATENT DOCUMENTS

| | | |
|---|---|---|
| 4,558,323 A | 12/1985 | Golinsky |
| 5,051,751 A | 9/1991 | Gray |
| 5,479,360 A | 12/1995 | Seif et al. |
| 8,437,972 B2 | 5/2013 | Ploplys et al. |
| 8,799,189 B2 | 8/2014 | Schwoegler et al. |
| 9,612,316 B1 | 4/2017 | Griesmeyer |
| 10,371,784 B2 | 8/2019 | Karlov et al. |

(Continued)

OTHER PUBLICATIONS

Muller et al., "Real-Time Correction of Atmospherically Degraded Telescope Images Through Image Sharpening." Stanford Research Institute, Jul. 1974.

(Continued)

*Primary Examiner* — James M McPherson
*Assistant Examiner* — Bakari Underwood
(74) *Attorney, Agent, or Firm* — Lando & Anastasi, LLP

(57) ABSTRACT

A method for determining positions of moving targets in unbiased three-dimensional (3D) measurement spaces using data collected against the moving targets by an electro-optical or infrared (EO/IR) sensor, the method comprising receiving data collected from electrical signals reflected from the moving targets in a first focal plane of the EO/IR sensor at a first time point, receiving data collected from electrical signals reflected from the moving targets in a second focal plane of the EO/IR sensor at a second time point, generating two-dimensional (2D) measurement data for the moving targets in the first and second focal planes, calculating 3D target velocities for the moving targets using the 2D measurement data, and estimating local 3D positions within a first unbiased 3D measurement space for the moving targets at the first and second time points based on the 3D target velocity.

20 Claims, 10 Drawing Sheets

(56) References Cited

U.S. PATENT DOCUMENTS

2009/0008554 A1    1/2009  Weir et al.
2017/0350956 A1*  12/2017  Karlov ................ G01B 11/002

OTHER PUBLICATIONS

Gonsiorowski et al., "Adaptive Optics: Taming Atmospheric Turbulence", Daptive Optics Associates, Inc., A Wholly Owned Subsidiary of Northrop Grumman Systems, <https://www.photonics.com/Articles/Adaptive_Optics_Taming_Atmospheric_Turbulence/a25129>.

* cited by examiner

SYSTEM AND METHOD FOR SINGLE-SENSOR MULTI-TARGET 3D TRACKING IN AN UNBIASED MEASUREMENT SPACE

BACKGROUND

1. Field

Embodiments of the disclosure relate generally to electro-optical/infrared (EO/IR) sensor systems and, more particularly, to a system and method of a single sensor, multi-target 3D fusion using an unbiased 3D measurement space.

2. Discussion of Related Art

As is known in the art, 2D sensors have been used to provide multi-target 3D tracking. Some tracking systems include multiple sensors (e.g., EO/IR, RF, etc.) to provide 3D measurement spaced. In many cases, such tracking systems use non-linear triangulation methods to initialize target positions in 3D and filters to refine the estimated target positions. Such non-linear mapping/filtering processes can be computationally complex and expensive. In addition, LOS biases in the focal planes of the sensors can produce large measurement errors.

SUMMARY

At least one aspect of the present disclosure is directed to a method for determining positions of one or more moving targets in unbiased three-dimensional (3D) measurement spaces using data collected against the one or more moving targets by an electro-optical or infrared (EO/IR) sensor. The method includes receiving data collected from electrical signals reflected from the one or more moving targets in a first focal plane of the EO/IR sensor at a first time point, receiving data collected from electrical signals reflected from the one or more moving targets in a second focal plane of the EO/IR sensor at a second time point, generating two-dimensional (2D) measurement data for the one or more moving targets in the first and second focal planes, calculating 3D target velocities for the one or more moving targets in the first and second focal planes using the 2D measurement data, and estimating local 3D positions within a first unbiased 3D measurement space for the one or more moving targets at the first and second time points based on the 3D target velocity.

In one embodiment, the 2D measurement data includes a boresight LOS for each of the first and second focal planes, target line of sights (LOS) to the one or more moving targets for the first and second focal planes, and 2D relative target velocities for the one or more moving targets in each of the first and second focal planes. In some embodiments, the 2D relative target velocities in the first focal plane are calculated using 2D target positions at the first time point and 2D target positions at a third time point, the third time point being between the first and second time points. In certain embodiments, the 2D relative target velocities in the second focal plane are calculated using 2D target positions at the second time point and 2D target positions at a fourth time point, the fourth time point being between the second and third time points.

In some embodiments, the method includes recording a first boresight LOS rate corresponding to a 2D velocity of the EO/IR sensor at the first time point, recording a second boresight LOS rate corresponding to a 2D velocity of the EO/IR sensor at the second time point, calculating absolute target velocities in the first focal plane by subtracting the first boresight LOS rate from the 2D relative target velocities in the first focal plane, and calculating absolute target velocities in the second focal plane by subtracting the second boresight LOS rate from the 2D relative target velocities in the second focal plane.

In certain embodiments, calculating 3D target velocities using the 2D measurement data includes calculating a plurality of 3D target velocities for each of the one or more moving targets corresponding to possible combinations of target range values along the target LOSs of the first focal plane and the target LOSs of the second focal plane.

In various embodiments, estimating local 3D positions within the first unbiased 3D measurement space for the one or more moving targets at the first and second time points based on the 3D target velocities includes projecting the plurality of 3D target velocities for each target as a plurality of projected 2D target velocities in the first and second focal planes, identifying 2D target velocities from the plurality of projected 2D target velocities that align with the absolute target velocities in the first and second focal planes for each target, estimating local 3D positions for the one or more moving targets at the first and second time points based on target range values along the target LOSs of the first and second focal planed corresponding to the identified 2D target velocities, intersecting the boresight LOS for the first focal plane with the boresight LOS for the second focal plane, and calculating the closest intersection point in the first unbiased 3D measurement space to define a first 3D boresight point, wherein the local 3D positions of the one or more moving targets relative to the first 3D boresight point are invariant to LOS biases in the first and second focal planes.

In one embodiment, the method includes combining the first unbiased 3D measurement space with at least one second unbiased 3D measurement space to form a common unbiased 3D measurement space, the second unbiased 3D measurement space including a second 3D boresight point and local 3D positions of the one or more moving targets at different time points. In some embodiments, the local 3D positions of the one or more moving targets within the common unbiased 3D measurement space are relative to a common 3D boresight point, the common 3D boresight point being one of the first 3D boresight point and the second 3D boresight point.

In certain embodiments, the method includes filtering and/or modeling the local 3D positions of the one or more moving targets within the common unbiased 3D measurement space, receiving an absolute coordinate position corresponding to a selected target of the one or more moving targets, anchoring the common 3D boresight point of the common unbiased 3D measurement space in an absolute coordinate system based on the absolute coordinate position of the selected target, and calculating absolute coordinate positions for the one or more moving targets other than the selected target based on the anchored common 3D boresight point.

In various embodiments, filtering the local 3D positions of the one or more moving targets within the common unbiased 3D measurement space includes filtering out noise and measurement uncertainness to improve tracking accuracy. In some embodiments, modeling the local 3D positions of the one or more moving targets within the common unbiased 3D measurement space includes using physics-based models to predict and/or validate the motion of the one or more moving targets.

Another aspect of the present disclosure is directed to a system for determining positions of one or moving targets in unbiased three-dimensional (3D) measurement spaces using data collected against the one or more moving targets. The system includes an electro-optical/infrared (EO/IR) sensor, a receiver for receiving data collected from electrical signals reflected from the one or more moving targets by the EO/IR sensor in a first focal plane at a first time point and in a second focal plane at a second time point, and a processor coupled to the receiver and configured to generate two-dimensional (2D) measurement data for the one or more moving targets in the first and second focal planes, calculate 3D target velocities for the one or more moving targets using the 2D measurement data, and estimate local 3D positions within a first unbiased 3D measurement space for the one or more moving targets at the first and second time points based on the 3D target velocity.

In one embodiment, the 2D measurement data includes a boresight LOS for each of the first and second focal planes, target line of sights (LOS) to the one or more moving targets for the first and second focal planes, and 2D relative target velocities for the one or more moving targets in each of the first and second focal planes.

In some embodiments, the processor is configured to record a first boresight LOS rate corresponding to a 2D velocity of the EO/IR sensor at the first time point, record a second boresight LOS rate corresponding to a 2D velocity of the EO/IR sensor at the second time point, calculate absolute target velocities in the first focal plane by subtracting the first boresight LOS rate from the 2D relative target velocities in the first focal plane, and calculate absolute target velocities in the second focal plane by subtracting the second boresight LOS rate from the 2D relative target velocities in the second focal plane.

In certain embodiments, to calculate the 3D target velocities for the one or more moving targets using the 2D measurement data, the processor is configured to calculate a plurality of 3D target velocities for each of the one or more moving targets corresponding to possible combinations of target range values along the target LOSs of the first focal plane and the target LOSs of the second focal plane.

In one embodiment, to estimate local 3D positions within the first unbiased 3D measurement space for the one or more moving targets at the first and second time points based on the 3D target velocities, the processor is configured to project the plurality of 3D target velocities for each target as a plurality of projected 2D target velocities in the first and second focal planes, identify 2D target velocities from the plurality of projected 2D target velocities that align with the absolute target velocities in the first and second focal planes for each target, estimate local 3D positions for the one or more moving targets at the first and second time points based on target range values along the target LOSs of the first and second focal planes corresponding to the identified 2D target velocities, intersect the boresight LOS for the first focal plane with the boresight LOS for the second focal plane, and calculate the closest intersection point in the first unbiased 3D measurement space to define a first 3D boresight point, wherein the local 3D positions of the one or more moving targets relative to the first 3D boresight point are invariant to LOS biases in the first and second focal planes.

In some embodiments, the system includes an absolute positioning sub-system configured to track the one or more moving targets and provide absolute coordinate positions for the one or more moving targets. In various embodiments, the absolute positioning sub-system includes a laser detection and ranging (Laser Rangefinder) system.

In one embodiment, the processor is configured to combine the first unbiased 3D measurement space with at least one second unbiased 3D measurement space including local 3D positions of the one or more moving targets at different time points to form a common unbiased 3D measurement space having a common 3D boresight point, filter and/or model the local 3D positions of the one or more moving targets within the common unbiased 3D measurement space to reduce measurement uncertainties, receive an absolute coordinate position corresponding to a selected target of the one or more moving targets, anchor the common 3D boresight point of the common unbiased 3D measurement space in the absolute coordinate system based on the absolute coordinate position of the selected target, and calculate absolute coordinate positions for the one or more moving targets other than the selected target based on the anchored common 3D boresight point.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1A:
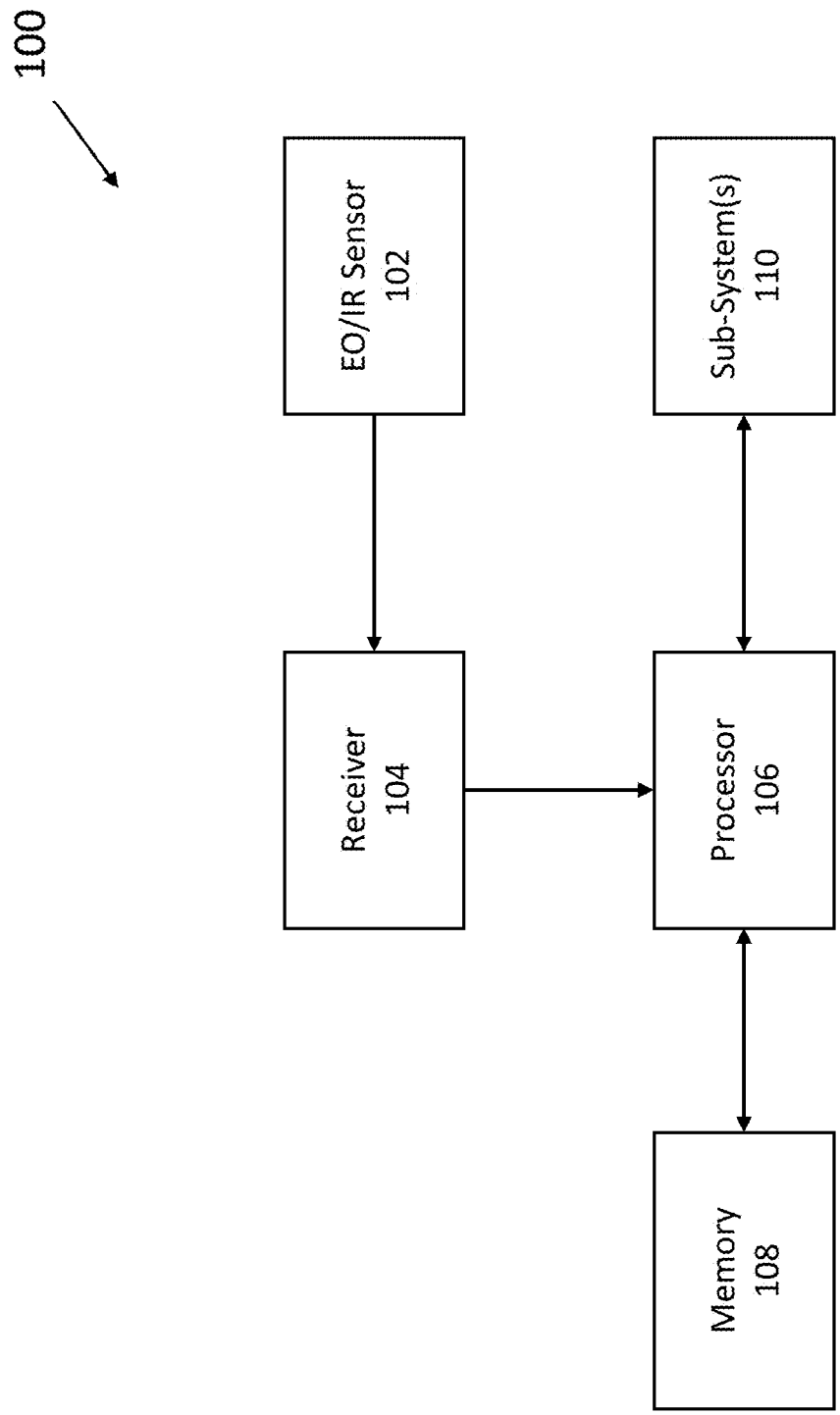
FIG. 1A is a block diagram of a tracking system in accordance with aspects described herein.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

As discussed above, typical multi-target 3D tracking systems include EO/IR and/or sensors and utilize non-linear triangulation methods to initialize target positions in 3D. In many cases, these tracking systems rely on non-linear filters (e.g., Kalman) to approximate linear azimuth/elevation line of sight (LOS) measurements. The approximated azimuth/elevation LOS measurements are used to refine estimates of target positions and velocities in time. In some cases, instead of a non-linear triangulation method, tracking systems utilize various tracking mechanisms (e.g., Multiple Hypotheses Tracking) for range initialization.

One challenge for accurate 3D tracking is the presence of line of sight (LOS) biases which are usually ~10× or up to 100× (depending on application) larger than the measurement errors in sensor focal planes (FPs). Some common LOS biases are caused by the sensor installation on the platform, misalignments between FP and the inertial measurement unit (IMU) including misalignments between focal planes of multi-band sensors; by uncertainties in positions of the sensors; by atmospheric refraction effects (including multi-band dependencies); and by time synchronization errors between multiple sensors.

In many cases, LOS biases are accounted for by 3D tracking systems as additional noise. Some 3D tracking systems attempt to estimate/calibrate LOS biases using a full 2D-to-3D mapping model and a stochastic model to account for slow-changing biases. However, such LOS bias errors are hard to characterize statistically (unlike random measurement noise) and therefore tracking system performance is reduced when a lack of knowledge of the statistics of the bias errors exists.

The effect of LOS biases is more severe for narrow/medium field-of-view (FOV) sensors (e.g., FOV<10°), when the goal is to fully utilize the high-pixel resolution of the sensors. In any case, it is highly desirable to isolate LOS biases, because, unlike measurement noise, they are difficult to characterize (correlated in time) and are unpredictable. Any mismatch in their statistical modeling can result into divergent 3D estimates.

Several approaches for using EO/IR sensors for 3D tracking in an unbiased measurement space are described in U.S. Patent Publication No. 2017/0350956 to Karlov et al. titled "SYSTEM AND METHOD FOR MULTI-SENSOR MULTI-TARGET 3D FUSION USING AN UNBIASED MEASUREMENT SPACE," which is hereby incorporated herein by reference. As described in the Karlov patent, a 3D tracking system including a single sensor is used to track stationary targets in an unbiased measurement space. However, the 3D tracking system must be configured with multiple sensors to track moving targets in an unbiased measurement space.

Accordingly, an improved 3D tracking system including a single EO/IR sensor for tracking moving targets in an unbiased measurement space is provided herein. In at least one embodiment, a 3D sensor is synthesized using a single 2D EO/IR sensor to track local arrangements of stationary and moving targets without the effects of LOS biases. In some examples, the single 2D EO/IR sensor can be integrated with other sub-systems to anchor the unbiased measurement space of the synthesized 3D sensor in absolute 3D space.

FIG. 1A illustrates a functional block diagram of a tracking system 100 in accordance with aspects described herein. In one example, the tracking system 100 includes an EO/IR sensor 102, a receiver 104, a processor 106, a memory module 108, and one or more additional sub-systems 110.

In one example, the EO/IR sensor 102 is configured to operate in a single frequency band; however, in other examples, the EO/IR sensor 102 may operate over multiple frequency bands. For example, the EO/IR sensor 103 may operate in one or more of the visible, Short-Wave Infrared (SWIR), Mid-Wave Infrared (MWIR), and Long-Wave Infrared (LWIR) wavebands.

In some examples, the EO/IR sensor 102 is configured to provide one or more focal planes for capturing target positions at various points in time. The EO/IR sensor 102 provides data to the receiver 104 corresponding to electrical signals reflected from targets in the one or more focal planes of the EO/IR sensor 102. The receiver 104 is configured to condition the data received from the EO/IR sensor 102 and provide the conditioned data to the processor 106 for further processing (e.g., target tracking) and/or storage in the memory module 108.

The additional sub-systems 110 may include one or more sub-systems configured to provide additional target tracking capabilities. For example, the additional sub-systems 110 can include a Laser Rangefinder system, a Global Positioning System (GPS), etc. In certain examples, the additional sub-systems 100 may include a reference system configured to provide position and orientation information associated with the EO/IR sensor 102 to the processor 106.

In various examples, the processor 106 may include one or more general computing processors, specialized processors, or microcontrollers. The processor 106 may include programmed, special-purpose hardware, for example, an application-specific integrated circuit (ASIC), or more generally designed hardware, such as a field programmable gate array (FPGA) or a general-purpose processor. In one example, the memory module 108 may include one or more memory devices, such as a disk drive, memory, flash memory, embedded or on-chip memory, or other device for storing data.

Figure 1B:
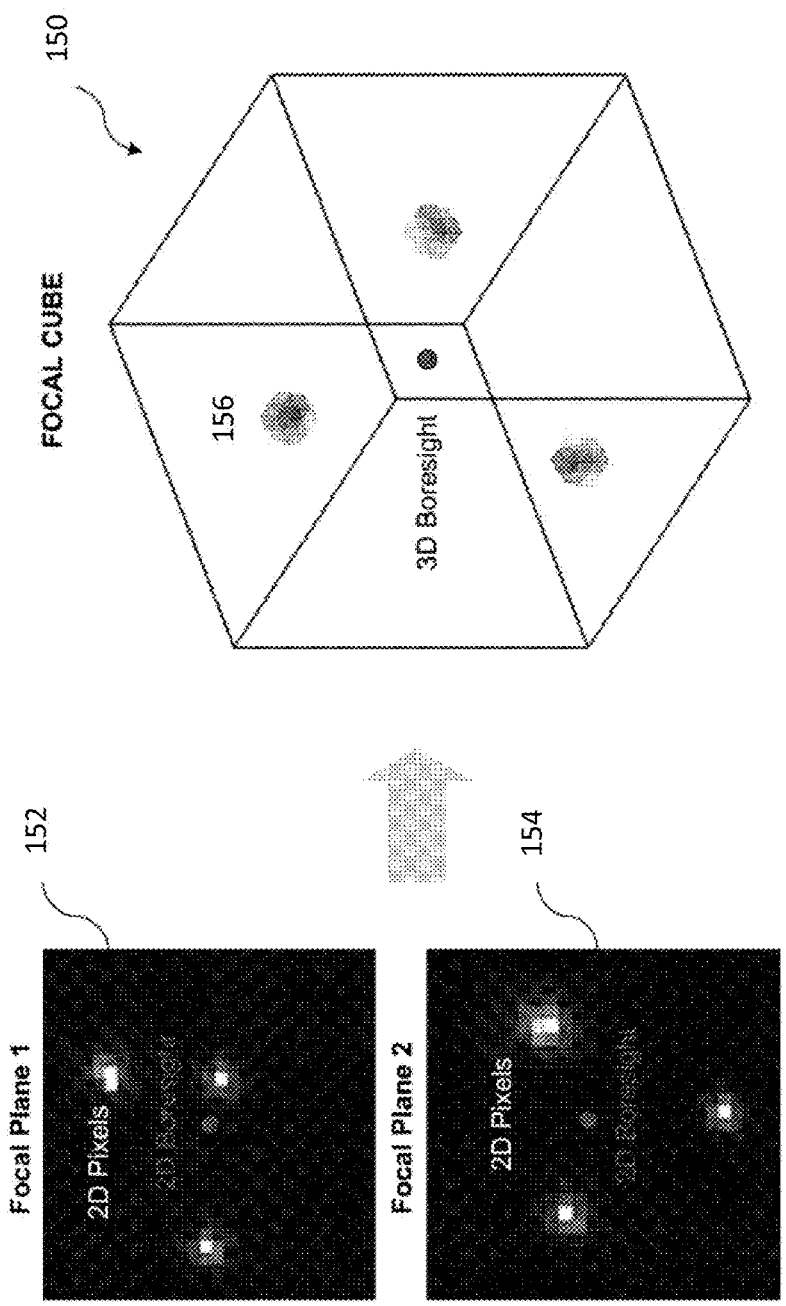
FIG. 1B is a diagram illustrating an unbiased measurement space in accordance with aspects described herein.

FIG. 1B illustrates a diagram of a focal cube 150 in accordance with aspects described herein. In one example, the focal cube 150 can be constructed using the tracking system 100 of FIG. 1A to provide an unbiased 3D measurement space.

As shown, the focal cube 150 corresponds to two (or more) 2D focal planes 152 and 154. In one example, the focal cube 150 represents an upgrade of the 2D focal planes 152 and 154 by a third dimension. The focal cube 150 has its origin "3D Boresight" similar to the two depicted focal planes 152 and 154 that have their origins at "2D Boresight." Also, the focal cube 150 has 3D voxels 156 as measurement units, which are similar to 2D pixels used as measurement units in the focal planes 152 and 154. As such, if targets are observed in 2D in the depicted focal planes 152 and 154, they can similarly be observed in 3D in the focal cube 150 with an equivalent 3D resolution, without any effects of LOS biases. In a 2D focal plane, one observes 2D apparent events, but in the 3D focal cube 150, one observes 3D real events (which can be modeled by the laws of physics) since the observation is in 3D.

The focal cube 150 provides the capability of operating in an unbiased measurement space to solve problems of target association, 3D target tracking, target characterization and the like at the pixel (voxel) level of accuracy. This approach provides the unbiased estimates of multiple targets in the local focal cube 150 instantaneously and with pixel-level accuracy, without any loss due to LOS biases. Moreover, unbiased multiple-target local estimates in the focal cube 150 can be effectively used as additional measurements for facilitating fast estimation of LOS biases and thus 3D boresight position of the focal cube 150 so that positions of targets in the absolute space can be easily determined.

Figure 2A:
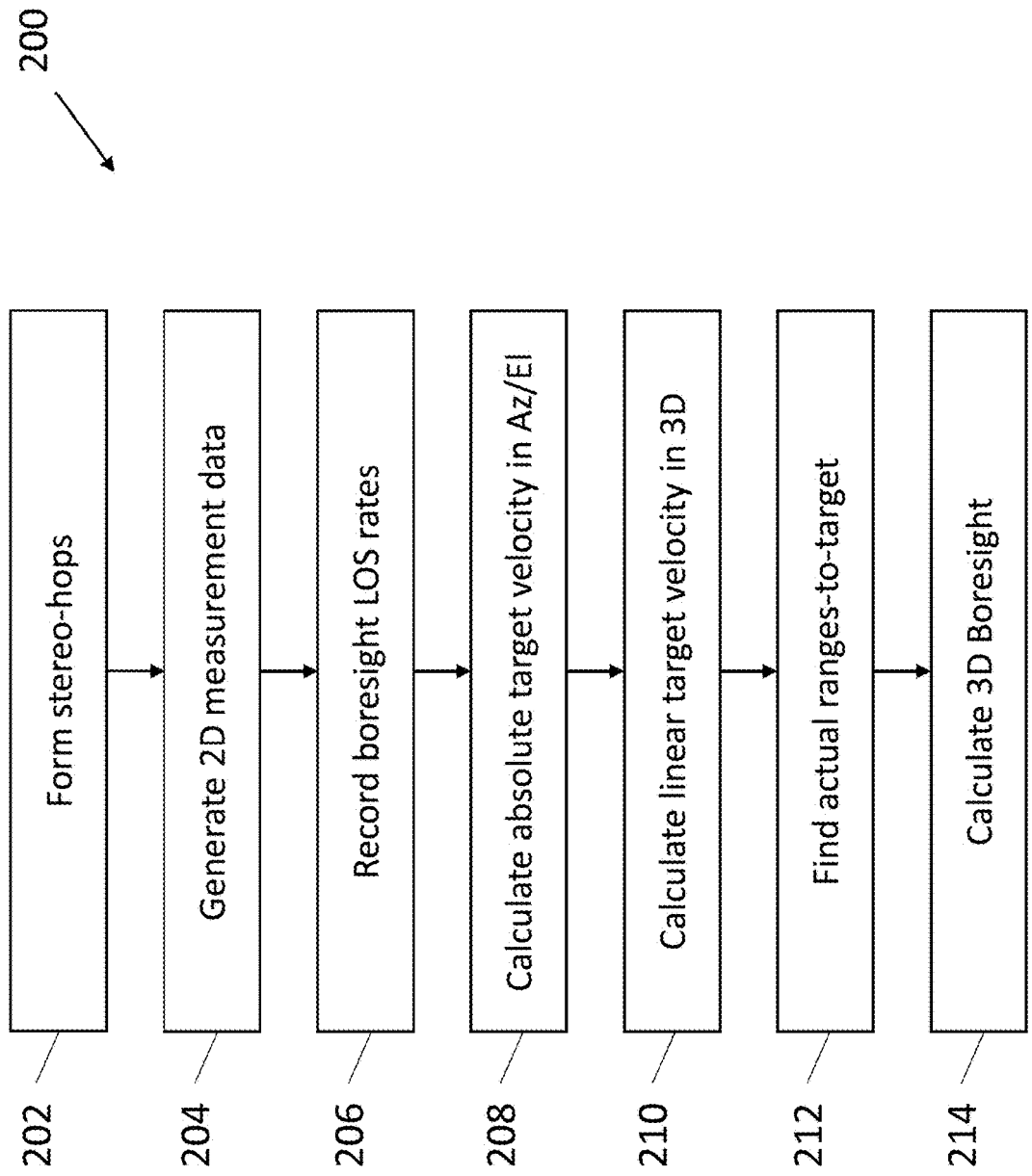
FIG. 2A is a flow diagram illustrating a method of constructing an unbiased measurement space in accordance with aspects described herein.

FIG. 2A illustrates a method 200 of constructing a focal cube using a single EO/IR sensor in accordance with aspects describe herein. In one example, the method 200 can be used to construct the focal cube 150 using the tracking system 100 of FIG. 1A.

Figure 2B:
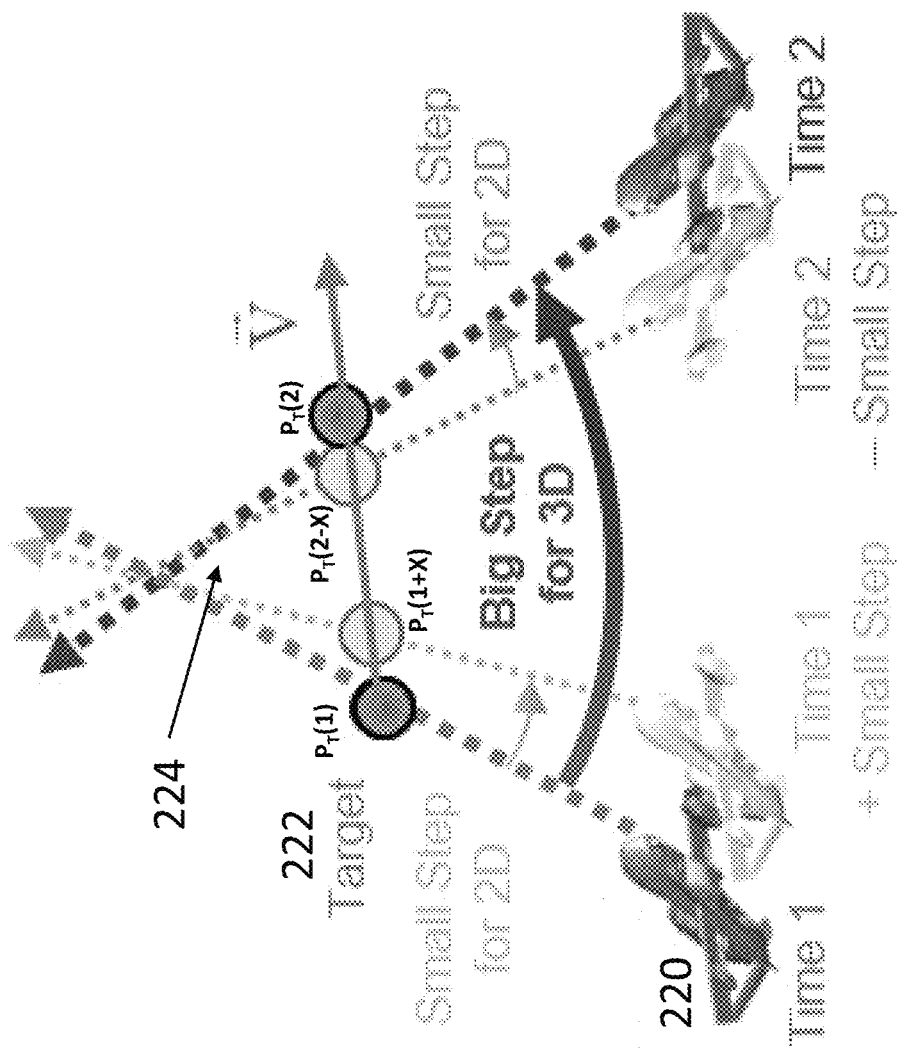
FIG. 2B is a diagram illustrating stereo-hops used to construct an unbiased measurement space in accordance with aspects described herein.

At block 202, stereo-hops are formed using the EO/IR sensor 102 to generate two or more focal planes. In one example, the sensor 102 is configured to move in 3D space to generate the stereo-hops (i.e., focal planes). As illustrated in FIG. 2B, the tracking system 100 may be attached to an aircraft 220. At "Time 1" the sensor 102 establishes a first focal plane to capture the 2D position $P_T(1)$ of the target 222. Once the position of the aircraft 220 (i.e., the sensor 102) has changed by a small step, the sensor 102 captures an updated 2D position $P_T(1+X)$ of the target 222 at "Time 1+Small Step". In some examples, the sensor 102 (or tracking system 100) can use the 2D positions $P_T(1)$ and $P_T(1+X)$ of the target 222 to generate 2D measurement data.

The aircraft 220 continues to move, and once the position of the aircraft 220 (i.e., the sensor 102) has changed by a large step, the sensor 102 establishes a second focal plane to capture the 2D position $P_T(2)$ of the target 222 at "Time 2". In some examples, the size of the large step is determined based on the value of a hinge angle 224 sufficient for producing a 3D parallax relative to the first and second focal planes. For example, the difference in the position of the aircraft 220 at "Time 1" and "Time 2" (i.e., the large step) results in the hinge angle 224, allowing the sensor 102 (or tracking system 100) to produce a 3D parallax using the first and second focal planes. In one example, a sufficient value for the hinge angle 224 may be between ~1-2°; however, in other examples the hinge angle 224 can be as small as ~0.25°.

In one example, before completing the large step at "Time 2", the sensor 102 captures an updated 2D position $P_T(2-X)$ of the target 222 at "Time 2—Small Step". In some examples, the step size between "Time 2" and "Time 2—Small Step" may be substantially the same as the step size between "Time 1" and "Time 1+Small Step". Likewise, the sensor 102 (or tracking system 100) can use the 2D positions $P_T(2)$ and $P_T(2-X)$ of the target 222 to generate 2D measurement data.

Figure 2C:
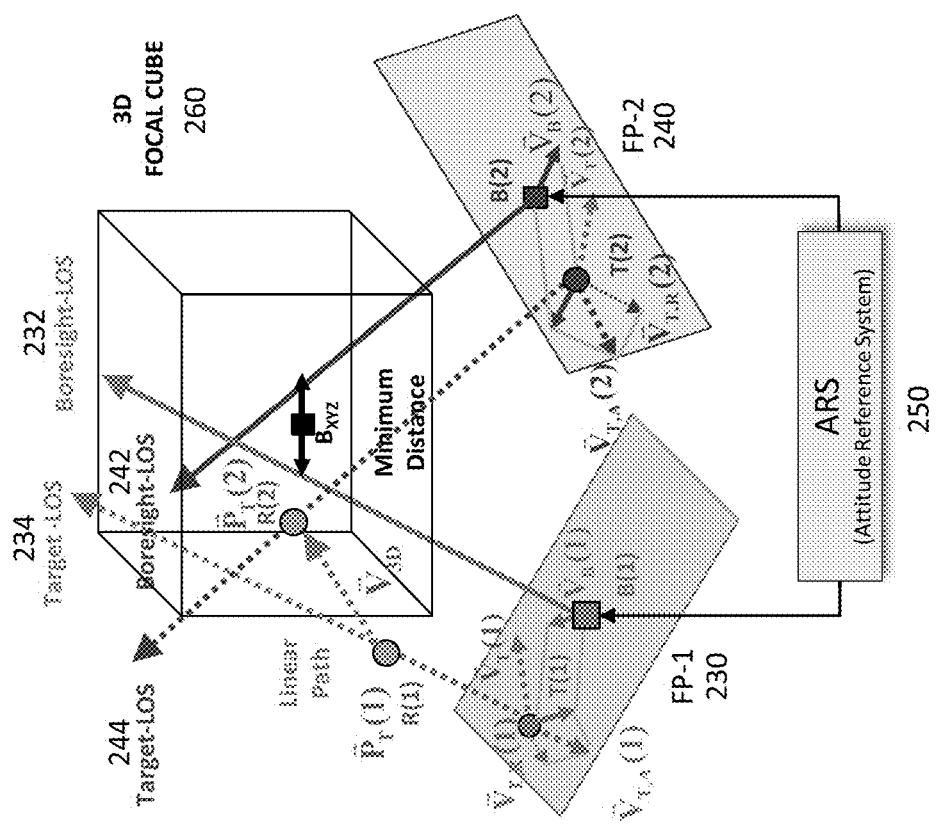
FIG. 2C is a diagram illustrating the construction of an unbiased measurement space in accordance with aspects described herein.

At block 204, after forming the stereo-hops, the 2D measurement data is generated relative to the target 222 and each focal plane. As shown in FIG. 2C, a boresight LOS 232 and a target LOS 234 are generated for the first focal plane 230 established at "Time 1". Likewise, a boresight LOS 242 and a target LOS 244 are generated for the second focal plane 240 established at "Time 2". In one example, each target LOS 234 and 244 can be obtained using known LOS reconstruction methods. In addition, the 2D relative velocity of the target 222 can be calculated for each focal plane (relative to boresight). For example, a first relative target velocity $\vec{V}_{T,R}(1)$ at "Time 1" is calculated for the first focal plane 230 and a second relative target velocity $\vec{V}_{T,R}(2)$ at "Time 2" is calculated for the second focal plane 240. In one example, the first relative target velocity $\vec{V}_{T,R}(1)$ is calculated using the 2D positions of the target 222 at "Time 1" and "Time 1+Small Step" (i.e., $P_T(1)$ and $P_T(1+X)$). Likewise, the second relative target velocity $\vec{V}_{T,R}(2)$ is calculated using the 2D positions of the target 222 at "Time 2" and "Time 2—Small Step" (i.e., $P_T(2)$ and $P_T(2-X)$).

At block 206, the boresight LOS rates are recorded for each focal plane. For example, a first boresight LOS rate $\vec{V}_B(1)$ is recorded for the first focal plane 230 and a second boresight LOS rate $\vec{V}_B(2)$ is recorded for the second focal plane 240. In one example, the boresight LOS rates correspond to the movement (or velocity) of the sensor 102 and/or the aircraft 220. In some examples, the boresight LOS rates are provided by an Attitude Reference System (ARS) 250 included in the aircraft 220. The ARS 250 includes an Inertial Measurement Unit (IMU) to obtain information related to the position/orientation of the aircraft 220 or the EO/IR sensor 102. In other examples, the boresight LOS rates can be provided by a different source or sensor of the aircraft 220.

At block 208, the absolute target velocity is calculated in terms of Az/El relative to each focal plane. In one example, the boresight LOS rates $\vec{V}_B(1)$, $\vec{V}_B(2)$ can be subtracted out of the relative target velocities $\vec{V}_{T,R}(1)$, $\vec{V}_{T,R}(2)$ to produce the absolute target velocities for each focal plane. As such, the absolute target velocities for each focal plane can be calculated using equations (1a) and (1b) below:

$$\vec{V}_{T,A}(1) = \vec{V}_{T,R}(1) - \vec{V}_B(1) \tag{1a}$$

$$\vec{V}_{T,A}(2) = \vec{V}_{T,R}(2) - \vec{V}_B(2) \tag{1b}$$

where, $\vec{V}_{T,A}(1)$ is the absolute target velocity for the first focal plane 230 and $\vec{V}_{T,A}(2)$ is the absolute target velocity for the second focal plane 240. As described above, the absolute target velocity vectors $\vec{V}_{T,A}(1)$, $\vec{V}_{T,A}(2)$ are in terms of Az/El. Being that the boresight LOS rates provided by the ARS 250 are subtracted out, the absolute target velocity vectors $\vec{V}_{T,A}(1)$, $\vec{V}_{T,A}(2)$ represent true target motion in the Az/El space isolated from the motion of the sensor 102 (or aircraft 220).

At block 210, the linear target velocity is calculated in 3D. The linear target velocity corresponds to the 3D velocity of the target 222 between "Time 1" and "Time 2". In one example, a linear 3D target velocity is calculated for every combination of possible range-to-target values along each target LOS 234 and 244. For example, as illustrated in FIG. 2B, the 3D position of the target at "Time 1" (i.e., $\vec{P}_T(1)$) could be at any location along the target LOS 234. As such, a plurality of possible values exists for the range-to-target at "Time 1" (i.e., $R(1)$). Likewise, the 3D position of the target at "Time 2" (i.e., $\vec{P}_T(2)$) could be at any location along the target LOS 244, and a plurality of possible values exists for the range-to-target at "Time 2" (i.e., $R(2)$). Each combination of possible range-to-target values can be used to calculate a corresponding linear target velocity in 3D using equation (2) below:

$$\vec{V}_{3D} = \frac{\vec{P}_T(2) - \vec{P}_T(1)}{\Delta t_{hop}} \quad (2)$$

where, $\vec{V}_{3D}$ is the linear 3D target velocity of the target 222 and $\Delta t_{hop}$ is the time difference between "Time 1" and "Time 2". In some examples, equation (2) can be solved iteratively by holding the 2D coordinates of $\vec{P}_T(1)$ and $\vec{P}_T(2)$ fixed, while substituting various combinations of range-to-target values for R(1) and R(2) into $\vec{P}_T(1)$ and $\vec{P}_T(2)$ to produce a plurality of linear 3D target velocities.

Once the plurality of linear target velocities in 3D are calculated, each linear target velocity is projected into the focal planes 230 and 240 (i.e., 2D). In one example, each linear target velocity $\vec{V}_{3D}$ can be represented in 2D using equation (3) below:

$$\vec{V}_{3D} = \{\vec{V}_T(1), \vec{V}_T(2)\}_{2D} \quad (3)$$

where, $\vec{V}_T(1)$ is the projected 2D linear velocity in the first focal plane 230 and $\vec{V}_T(2)$ is the projected 2D linear velocity in the second focal plane.

At block 212, the projected 2D linear velocities are used to find the actual range-to-target values for R(1) and R(2). For example, the projected 2D linear velocities can be used to identify the actual values for R(1) and R(2) from the possible values along each target LOS 234 and 244. The actual values for R(1) and R(2) can be identified by aligning the absolute target velocities $\vec{V}_{T,A}(1)$, $\vec{V}_{T,A}(2)$ (calculated at block 208) with the projected linear velocities $\vec{V}_T(1)$, $\vec{V}_T(2)$. In one example, the absolute target velocities and projected linear velocities can be aligned using equation (4) below:

$$J = \|\vec{V}_T(1) - \vec{V}_{T,A}(1)\|_2 + \|\vec{V}_T(2) - \vec{V}_{T,A}(2)\|_2 \to \min_{R(1),R(2)} \quad (4)$$

In some examples, equation (4) can be solved iteratively by substituting in projected linear velocity values until a convergence point where the absolute target velocities and projected linear velocities align is reached. As such, the pair of range-to-target values for R(1) and R(2) corresponding to the projected linear velocities $\vec{V}_T(1)$, $\vec{V}_T(2)$ which align with the absolute target velocities $\vec{V}_{T,A}(1)$, $\vec{V}_{T,A}(2)$ can be identified as the actual range-to-target values for R(1) and R(2).

At block 214, the 3D boresight of the focal cube 260 is calculated. In one example, the boresight LOS 232 for the first focal plane 230 and the boresight LOS 242 for the second focal plane 240 are intersected to calculate the 3D boresight. For example, as shown in FIG. 2C, the closest intersection point between the boresight LOS 232 and the boresight LOS 242 is $B_{xyz}$. The corresponding minimum distances are shown as the vectors from the closest point to each LOS 232, 242.

The boresight LOS intersection yields the estimate of the boresight in 3D (i.e., $B_{xyz}$), which defines the origin of the focal cube 260. The size of focal cube 260 in the absolute ECEF coordinate system is defined by a scope to which the focal planes 230 and 240 overlay.

Local estimates of target positions in the focal cube 260 can be formed as the difference between the target positions $\vec{P}_T(1)$, $\vec{P}_T(2)$ and the 3D boresight point $B_{xyz}$. In some examples, these local estimates of target positions can be used to calculate target velocities in the focal cube 260. Such local estimates of target positions and velocities with respect to 3D boresight $B_{xyz}$ are invariant to common LOS biases in the focal planes 230 and 240.

In one example, covariances associated with target position/velocity estimates from noise and/or measurement sensitivities can be calculated for the focal cube 260. In some examples, the calculated covariances can be used to improve the accuracy of local estimates within the focal cube 260.

While the example described above is directed to tracking a single target (i.e., target 222), it should be appreciated that embodiments described herein are not limited single-target tracking. For example, the method 200 can be used to track two or more moving targets within the focal cube 260. In some examples, the steps of the method 200 can be carried out in parallel for each individual target to provide real-time, multi-target tracking in the unbiased measurement space (i.e., focal cube 260). In order to track the target(s) in the unbiased measurement space over time, the sensor/aircraft continues to form stereo-hops (i.e., focal planes) and new focal cubes can be constructed from the focal plane pairs.

Figure 3A:
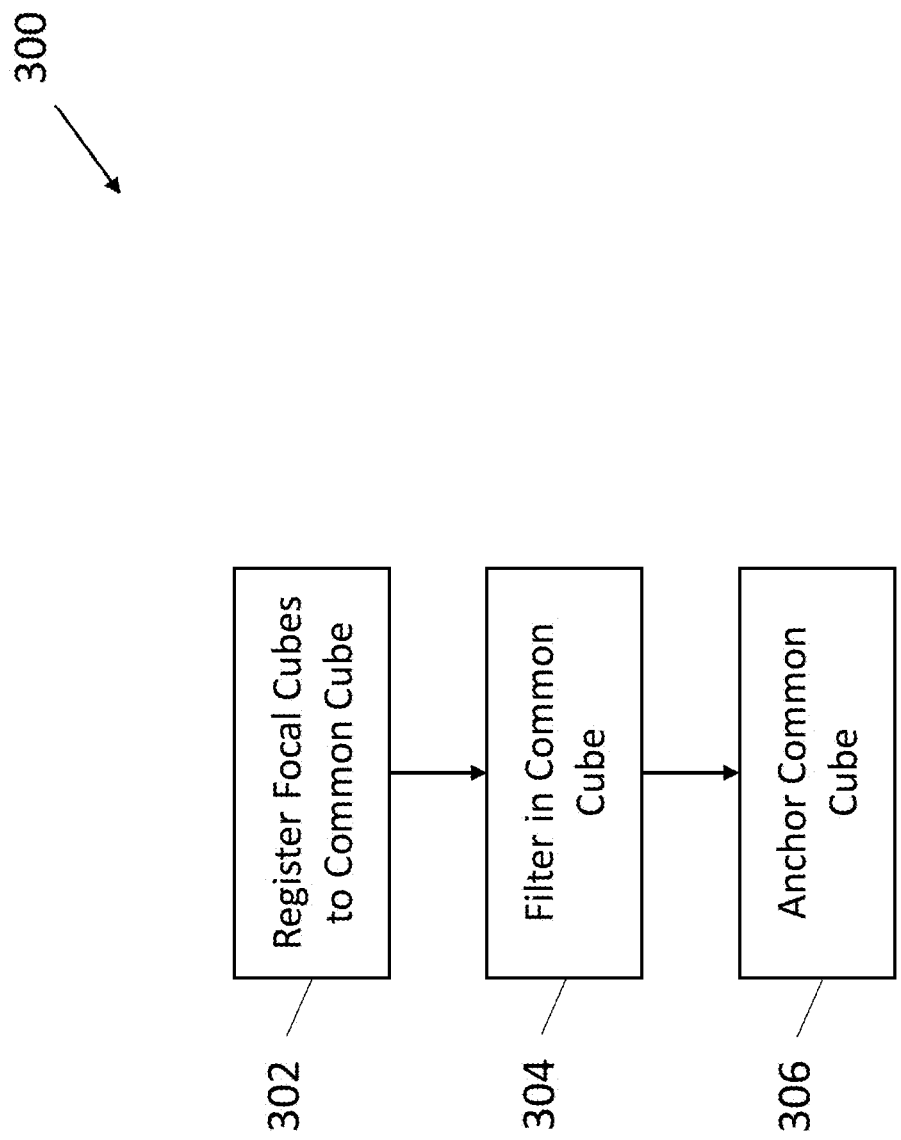
FIG. 3A is a flow diagram illustrating a method of providing a 3D fusion of an unbiased measurement space in accordance with aspects described herein.

FIG. 3A illustrates a method 300 of forming a common focal cube from multiple focal cubes constructed over time using the tracking system 100 in accordance with aspects describe herein. In one example, the method 300 corresponds to a "3D fusion" of the focal cube(s) into absolute 3D space.

Figure 3B:
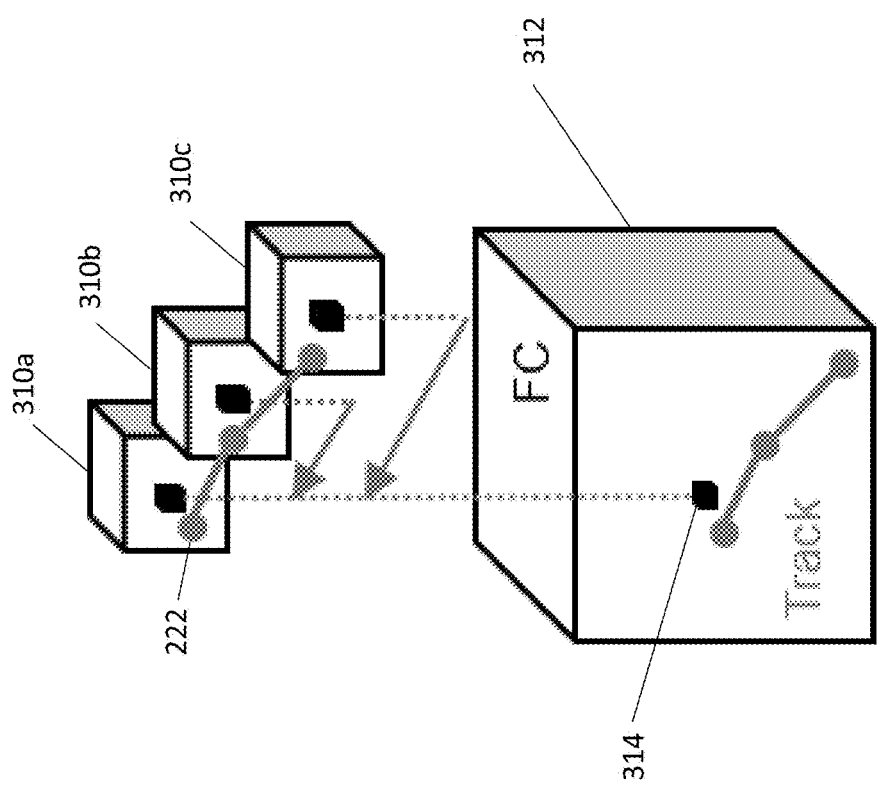
FIG. 3B is a diagram illustrating the 3D fusion of an unbiased measurement space in accordance with aspects described herein.

At block 302, the multiple focal cubes are registered to a common 3D boresight point. As shown in FIG. 3B, a first focal cube 310a, a second focal cube 310b, and a third focal cube 301c are constructed to track the moving target 222 over a period of time. For example, the first focal cube 310a can be constructed using a first focal plane at "Time 1" and a second focal plane at "Time 2", the second focal cube 310b can be constructed using the second focal plane and a third focal plane at "Time 3", and the third focal cube 310c can be constructed using the third focal plane and a fourth focal plane at "Time 4". In other examples, the focal cubes may be constructed differently.

As described above, a distinct 3D boresight point can be calculated for each of the focal cubes 310a, 310b, and 310c (e.g., block 214 of method 200). In some examples, the focal cubes are registered (or combined) to a common focal cube using the 3D boresight points. For example, as illustrated in FIG. 3B, the focal cubes are registered to the common focal cube 312. Being that the 3D boresight points of the focal cubes are known, each focal cube can be translated to reference a common 3D boresight 314 within the common focal cube 312. In one example, the common 3D boresight 314 is the 3D boresight point of the first focal cube 310a. As such, the common focal cube 312 provides an unbiased measurement space relative to a local ECEF reference point (i.e., the common 3D boresight 314), allowing the positions/velocities of targets to be measured locally in a linear, unbiased manner over time.

At block 304, the measured target positions (and velocities) are filtered to improve tracking accuracy and target association. In one example, a Kalman-type filter is used to filter out noise and measurement uncertainties over time. In some examples, the calculated covariances for noise and/or measurement sensitivities associated with each of the focal cubes 310a, 310b, and 310c can be provided to Kalman-type filter to further improve accuracy. Being that the target positions are measured locally within the common focal cube 312, the Kalman-type filter can be configured to filter the linear 3D measurements directly, rather than raw non-linear Az/El positions (i.e., 2D). As such, a large covariance matrix is not needed, and the computational complexity of filtering the target measurements can be reduced.

In certain examples, dynamic models can be used to further improve accuracy and target association when tracking maneuvering targets. For example, physics-based equations/models can be used to predict and/or validate the motion of moving targets. Such models can be used to optimize tracking accuracy within the common focal cube 312, as changes in the gravity field within the 3D unbiased measurement space of the common focal cube 312 are considered negligible.

As described above, the position of the moving target(s) can be tracked locally within the unbiased measurement space of the common focal cube 312 relative to the common 3D boresight 314. As such, the tracked target positions within the common focal cube 312 are "undocked" from the absolute ECEF (e.g., geographic/global coordinates). In some examples, the common focal cube 312 can be "docked" or "anchored" to determine target positions within the absolute ECEF.

At block 306, the common focal cube 312 is anchored in the absolute ECEF. In some examples, the common focal cube 312 can be anchored using measurements from the EO/IR sensor; however, in other examples, a different tracking/measurement system can be used to anchor the common focal cube 312. For example, as described above, the tracking system 100 can include a Laser Rangefinder sub-system, and the Laser Rangefinder sub-system can be used to anchor the 3D boresight 314 of the common focal cube 312 in absolute ECEF.

Figure 3C:
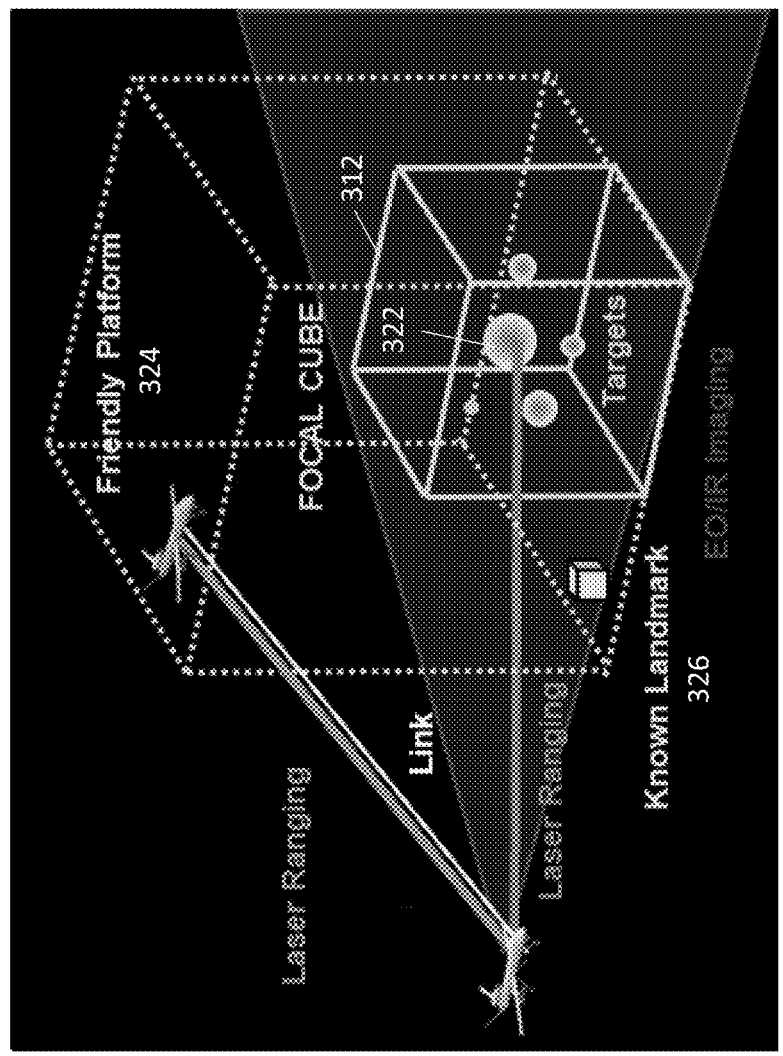
FIG. 3C is a diagram of illustrating several methods of anchoring an unbiased measurement space in accordance with aspects described herein.

FIG. 3C illustrates several methods that can be used to anchor the common focal cube 312 in absolute ECEF. In one example, a first anchoring method includes lasing to a reference target 322 within the common focal cube 312 using the Laser Rangefinder sub-system. In some examples, the reference target 322 is one of the moving targets being tracked within the common focal cube 312. The Laser Rangefinder sub-system can determine the absolute ECEF position of the reference target 322 using, for example, known laser ranging and positioning techniques. After the absolute ECEF position of the reference target 322 is determined, the previously estimated position of the reference target 322 relative to 3D boresight 314 can be used to anchor 3D boresight 314 in the absolute ECEF. As such, the absolute ECEF positions of other targets in the common focal cube 312 can now be determined using the local position estimates of the targets relative to 3D boresight 314 and the known absolute ECEF position of 3D boresight 314.

In some examples, the common focal cube 312 may be expanded to include specific platforms/landmarks. For example, a second anchoring method includes lasing to a friendly platform 324 included within the common focal cube 312 using the Laser Rangefinder sub-system. In one example, the Laser Rangefinder sub-system is used to determine the absolute ECEF position of the friendly platform 324, and the absolute ECEF position of the friendly platform 324 can be used to anchor 3D boresight 314 in the absolute ECEF. Similar to the first anchoring method, the absolute ECEF positions of the targets in the common focal cube 312 can be determined using the local position estimates of the targets relative to 3D boresight 314 and the known absolute ECEF position of 3D boresight 314.

Likewise, in a third anchoring method, a known landmark 326 included in the common focal cube 312 can be used to anchor 3D boresight 314. In one example, an estimated position of the known landmark 326 relative to 3D boresight 314 and the known absolute ECEF position of the known landmark 326 are utilized to anchor 3D boresight 314 in the absolute ECEF. Similar to the examples described above, the absolute ECEF positions of the targets in the common focal cube 312 can be determined using the local position estimates of the targets relative to 3D boresight 314 and the known absolute ECEF position of 3D boresight 314.

In a fourth anchoring method, a communication link with the friendly platform 324 may be used to anchor 3D boresight 314. For example, an indication of the friendly platform's position (e.g., GPS position) may be provided to the tracking system 100. The tracking system can use the received position of the friendly platform 324 to determine the absolute ECEF position of the friendly platform 324. The absolute ECEF position of the friendly platform 324 and the estimated position of the friendly platform 324 relative to 3D boresight 314 can be used to anchor 3D boresight 314 in the absolute ECEF. Similar to the examples described above, the absolute ECEF positions of the targets in the common focal cube 312 can be determined using the local position estimates of the targets relative to 3D boresight 314 and the known absolute ECEF position of 3D boresight 314.

In some examples, the estimated positions of the targets within the common focal cube 312 may be used to anchor 3D boresight 314. For example, in a fifth anchoring method, a LOS bias model can be used to estimate the LOS biases and covariances for each target. The position of the target identified as having the best range-to-target (i.e., least amount of LOS bias/covariances) can be used to anchor 3D boresight in the absolute ECEF. Similar to the examples described above, the absolute ECEF positions of the targets in the common focal cube 312 can be determined using the local position estimates of the targets relative to 3D boresight 314 and the known absolute ECEF position of 3D boresight 314.

In one example, the type of anchoring method used may depend on the capabilities of the tracking system 100 (i.e., Laser Rangefinder, GPS, etc.) and/or specific tracking applications. In certain examples, the tracking system 100 may utilize two or more of the anchoring methods described above. In some examples, by anchoring 3D boresight 314 and using the local estimates of target positions to determine absolute ECEF target positions, the tracking system 100 can maintain the pixel-level accuracy of the EO/IR sensor without the effects of LOS biases.

Figure 4:
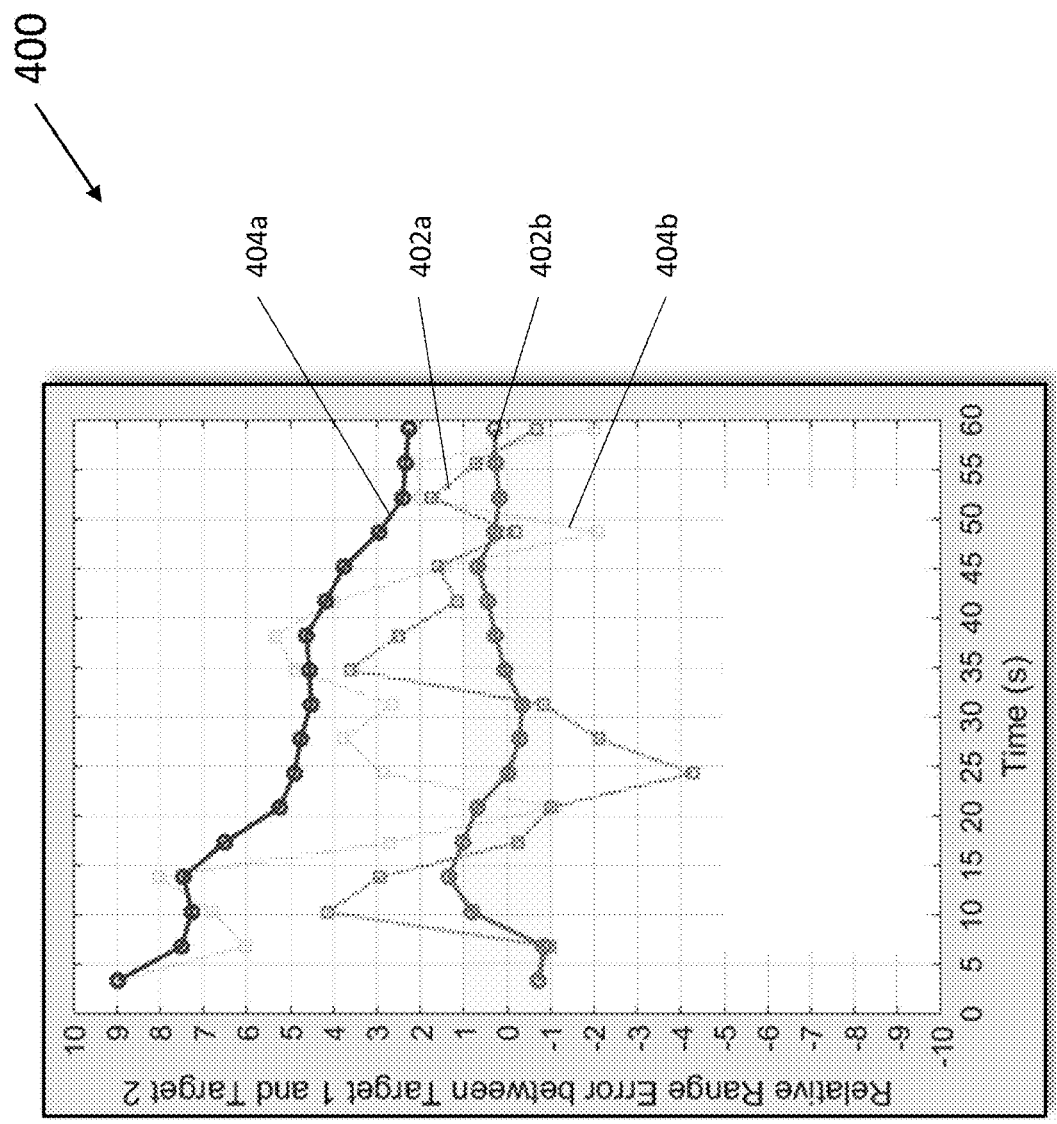
FIG. 4 is a graph illustrating range error performance of tracking systems in accordance with aspects described herein.

FIG. 4 is graph 400 illustrating range error performance of various tracking systems in accordance with aspects described herein. In one example, the graph 400 compares the performance of systems tracking two moving targets (e.g., Target 1 and Target 2) over a series of frames. The trace 402*a* corresponds the relative range error between Targets 1 and 2 using the tracking system 100 and the trace 404*a* corresponds the relative range error between Targets 1 and 2 using a conventional tracking system. Likewise, the trace 404*b* corresponds to the filtered relative range error for the tracking system 100 and the trace 404*b* corresponds to relative range error for the conventional tracking system.

As shown by trace 404*a*, the conventional system produces a positive range error, indicating the performance of the conventional system is heavily influenced by the presence of LOS biases. The filtered result (trace 404*b*) provides little improvement, as the non-random LOS bias is not easily filtered out. In comparison, the tracking system 100 produces a random range error, indicating the performance of the tracking system 100 is substantially immune or invariant to LOS biases. As such, the filtered result (trace 404b) provides significant improvement, as random error (e.g., noise) is easier to filter out. In some examples, being that the random error is effectively filtered out over multiple frames, the tracking system 100 can provide much higher accuracy with faster track convergence.

Figure 5:
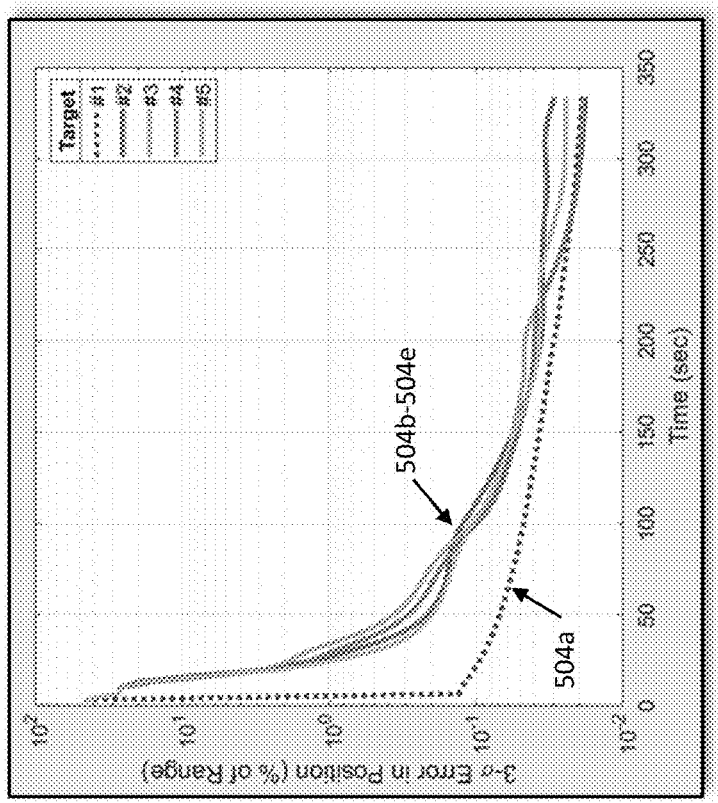
FIG. 5 is a graph illustrating position error performance of tracking systems in accordance with aspects described herein.
Figure 5:
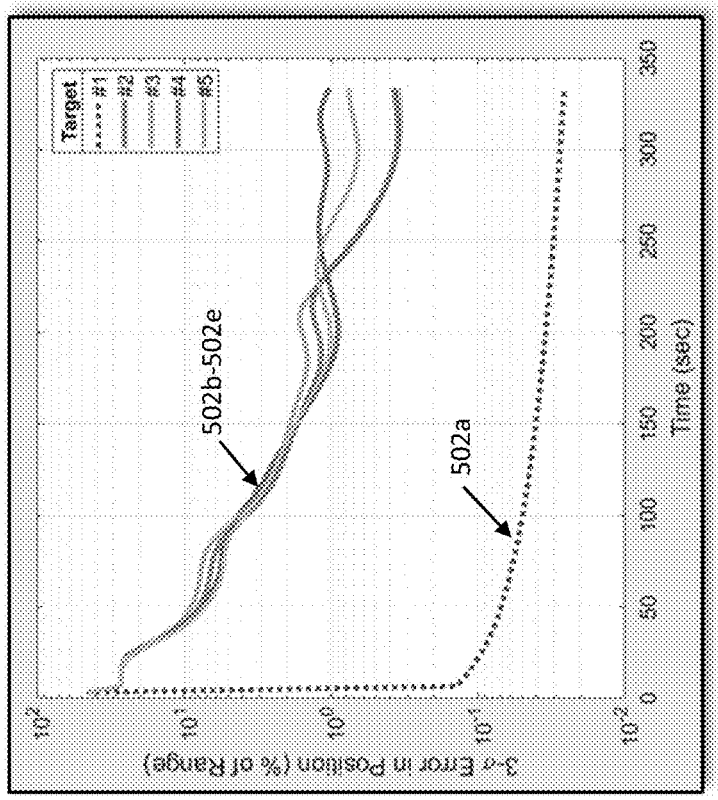

FIG. 5 includes graphs 502, 504 illustrating position error performance of various tracking systems in accordance with aspects described herein. In one example, graph 502 represents the position errors for targets 502a-502e being tracked by the conventional tracking system. Likewise, graph 504 represents the position errors for targets 504a-504e being tracked by the tracking system 100.

In the illustrated example, the position of the target 502a in graph 502 is actively tracked using a laser-ranging system (e.g., Laser Rangefinder). The positions of the other targets 502b-502e are passively tracked using the conventional tracking system. As shown, the position error of the actively tracked target 502a is substantially smaller than the position errors of the passively tracked targets 502b-502e. As such, the positions of the targets 502b-502e are tracked with less accuracy compared to the position of the actively tracked target 502a.

In one example, graph 504 corresponds to operation of the tracking system 100 using the first anchoring method described above with respect to FIG. 3C. For example, the position of the target 504a (i.e., reference target) is actively tracked using Laser Rangefinder. In addition, the position of the target 504a and the positions of the other targets 504b-504e are passively tracked using the EO/IR sensor 102. The estimated position and the laser-measured position of the target 504a are used to anchor 3D boresight of a focal cube including the targets 504a-504e. As such, the position errors of the passively tracked targets 504b-504e can be reduced and are substantially similar to the position error of the actively tracked target 504a. In other examples, one or more different anchoring methods, such as those described above with respect to FIG. 3C, can be used to produce similar tracking performance.

As described above, an improved 3D tracking system including a single EO/IR sensor for tracking moving targets in an unbiased measurement space is provided herein. In at least one embodiment, a 3D sensor is synthesized using the single 2D EO/IR sensor to track local arrangements of stationary and moving targets without the effects of LOS biases. In some examples, the single 2D EO/IR sensor can be integrated with other sub-systems to anchor the unbiased measurement space of the synthesized 3D sensor in absolute 3D space.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A method for determining positions of one or more moving targets in unbiased three-dimensional (3D) measurement spaces using data collected against the one or more moving targets by a single electro-optical or infrared (EO/IR) sensor, the method comprising:

collecting, from the single EO/IR sensor, first data collected from electrical signals reflected from the one or more moving targets in a first focal plane of the single EO/IR sensor at a first time point;

moving the single EO/IR sensor so that the one or more moving targets change from the first focal plane of the single EO/IR sensor at the first time point to a second focal plane of the single EO/IR sensor at a second time point;

collecting, from the single EO/IR sensor, second data collected from electrical signals reflect from the one or more moving targets in the second focal plane of the single EO/IR sensor at the second time point;

generating two-dimensional (2D) measurement data for the one or more moving targets in the first focal plane and the second focal plane;

calculating 3D target velocities for the one or more moving targets in the first focal plane and the second focal plane using the 2D measurement data;

estimating local 3D positions within a first unbiased 3D measurement space for the one or more moving targets at the first time point and the second time point based on the 3D target velocities; and predicting and/or validating motion of the one or more moving targets based on the estimated local 3D positions within the first unbiased 3D measurement space.

2. The method of claim 1, wherein the 2D measurement data includes a boresight LOS for each of the first focal plane and the and second focal plane, target line of sights (LOS) to the one or more moving targets for the first focal plane and the second focal plane, and 2D relative target velocities for the one or more moving targets in each of the first focal plane and the second focal plane.

3. The method of claim 2, wherein the 2D relative target velocities in the first focal plane are calculated using 2D target positions at the first time point and 2D target positions at a third time point, the third time point being between the first time point and the second time point.

4. The method of claim 3, wherein the 2D relative target velocities in the second focal plane are calculated using 2D target positions at the second time point and 2D target positions at a fourth time point, the fourth time point being between the second time point and the third time point.

5. The method of claim 2, further comprising:

recording a first boresight LOS rate corresponding to a 2D velocity of the single EO/IR sensor at the first time point;

recording a second boresight LOS rate corresponding to a 2D velocity of the single EO/IR sensor at the second time point;

calculating absolute target velocities in the first focal plane by subtracting the first boresight LOS rate from the 2D relative target velocities in the first focal plane; and calculating absolute target velocities in the second focal plane by subtracting the second boresight LOS rate from the 2D relative target velocities in the second focal plane.

6. The method of claim 5, wherein calculating 3D target velocities using the 2D measurement data includes calculating a plurality of 3D target velocities for each of the one or more moving targets corresponding to possible combinations of target range values along the target LOSs of the first focal plane and the target LOSs of the second focal plane.

7. The method of claim 6, wherein estimating local 3D positions within the first unbiased 3D measurement space for the one or more moving targets at the first time point and the second time point based on the 3D target velocities includes:
projecting the plurality of 3D target velocities for each target as a plurality of projected 2D target velocities in the first focal plane and the second focal plane;
identifying 2D target velocities from the plurality of projected 2D target velocities that align with the absolute target velocities in the first focal plane and the second focal plane for each target;
estimating local 3D positions for the one or more moving targets at the first time point and the second time point based on target range values along the target LOSs of the first focal plane and the second focal plane corresponding to the identified 2D target velocities;
intersecting the boresight LOS for the first focal plane with the boresight LOS for the second focal plane; and
calculating the closest intersection point in the first unbiased 3D measurement space to define a first 3D boresight point, wherein the local 3D positions of the one or more moving targets relative to the first 3D boresight point are invariant to LOS biases in the first focal plane and the second focal plane.

8. The method of claim 7, further comprising combining the first unbiased 3D measurement space with at least one second unbiased 3D measurement space to form a common unbiased 3D measurement space, the second unbiased 3D measurement space including a second 3D boresight point and local 3D positions of the one or more moving targets at different time points.

9. The method of claim 8, wherein the local 3D positions of the one or more moving targets within the common unbiased 3D measurement space are relative to a common 3D boresight point, the common 3D boresight point being one of the first 3D boresight point and the second 3D boresight point.

10. The method of claim 9, further comprising:
filtering and/or modeling the local 3D positions of the one or more moving targets within the common unbiased 3D measurement space;
receiving an absolute coordinate position corresponding to a selected target of the one or more moving targets;
anchoring the common 3D boresight point of the common unbiased 3D measurement space in an absolute coordinate system based on the absolute coordinate position of the selected target; and
calculating absolute coordinate positions for the one or more moving targets other than the selected target based on the anchored common 3D boresight point.

11. The method of claim 10, wherein filtering the local 3D positions of the one or more moving targets within the common unbiased 3D measurement space includes filtering out noise and measurement uncertainness to improve tracking accuracy.

12. The method of claim 10, wherein modeling the local 3D positions of the one or more moving targets within the common unbiased 3D measurement space includes using physics-based models to predict and/or validate the motion of the one or more moving targets.

13. A system for determining positions of one or moving targets in unbiased three-dimensional (3D) measurement spaces using data collected against the one or more moving targets, the system comprising:
a single electro-optical/infrared (EO/IR) sensor;
a receiver for receiving data collected from electrical signals reflected from the one or more moving targets by the single EO/IR sensor in a first focal plane at a first time point and in a second focal plane at a second time point; and
a processor coupled to the receiver and configured to:
generate two-dimensional (2D) measurement data for the one or more moving targets in the first focal plane and the second focal plane;
calculate 3D target velocities for the one or more moving targets using the 2D measurement data;
estimate local 3D positions within a first unbiased 3D measurement space for the one or more moving targets at the first time point and the second time point based on the 3D target velocity; and
predict and/or validate motion of the one or more moving targets based on the estimated local 3D positions within the first unbiased 3D measurement space.

14. The system of claim 13, wherein the 2D measurement data includes a boresight LOS for each of the first focal plane and the second focal plane, target line of sights (LOS) to the one or more moving targets for the first focal plane and the second focal plane, and 2D relative target velocities for the one or more moving targets in each of the first focal plane and the second focal plane.

15. The system of claim 14, wherein the processor is further configured to:
record a first boresight LOS rate corresponding to a 2D velocity of the single EO/JR sensor at the first time point;
record a second boresight LOS rate corresponding to a 2D velocity of the single EO/JR sensor at the second time point;
calculate absolute target velocities in the first focal plane by subtracting the first boresight LOS rate from the 2D relative target velocities in the first focal plane; and
calculate absolute target velocities in the second focal plane by subtracting the second boresight LOS rate from the 2D relative target velocities in the second focal plane.

16. The system of claim 15, wherein to calculate the 3D target velocities for the one or more moving targets using the 2D measurement data, the processor is further configured to calculate a plurality of 3D target velocities for each of the one or more moving targets corresponding to possible combinations of target range values along the target LOSs of the first focal plane and the target LOSs of the second focal plane.

17. The system of claim 16, wherein to estimate local 3D positions within the first unbiased 3D measurement space for the one or more moving targets at the first time point and the second time point based on the 3D target velocities, the processor is further configured to:
project the plurality of 3D target velocities for each target as a plurality of projected 2D target velocities in the first focal plane and the second focal plane;
identify 2D target velocities from the plurality of projected 2D target velocities that align with the absolute target velocities in the first focal plane and the second focal plane for each target;
estimate local 3D positions for the one or more moving targets at the first time point and the second time point based on target range values along the target LOSs of the first focal plane and the second focal plane corresponding to the identified 2D target velocities;
intersect the boresight LOS for the first focal plane with the boresight LOS for the second focal plane; and
calculate the closest intersection point in the first unbiased 3D measurement space to define a first 3D boresight point, wherein the local 3D positions of the one or more moving targets relative to the first 3D boresight point are invariant to LOS biases in the first focal plane and the second focal plane.

18. The system of claim 17, further comprising an absolute positioning sub-system configured to track the one or more moving targets and provide absolute coordinate positions for the one or more moving targets.

19. The system of claim 18, wherein the absolute positioning sub-system includes a laser detection and ranging (Laser Rangefinder) system.

20. The system of claim 18, wherein the processor is further configured to:
- combine the first unbiased 3D measurement space with at least one second unbiased 3D measurement space including local 3D positions of the one or more moving targets at different time points to form a common unbiased 3D measurement space having a common 3D boresight point;
- filter and/or model the local 3D positions of the one or more moving targets within the common unbiased 3D measurement space to reduce measurement uncertainties;
- receive an absolute coordinate position corresponding to a selected target of the one or more moving targets;
- anchor the common 3D boresight point of the common unbiased 3D measurement space in the absolute coordinate system based on the absolute coordinate position of the selected target; and
- calculate absolute coordinate positions for the one or more moving targets other than the selected target based on the anchored common 3D boresight point.

* * * * *